US012712277B2

(12) United States Patent
Sun et al.

(10) Patent No.: US 12,712,277 B2
(45) Date of Patent: Aug. 18, 2026

(54) BASE STATION ANTENNAS HAVING COMPACT DUAL-POLARIZED BOX DIPOLE RADIATING ELEMENTS THEREIN THAT SUPPORT HIGH BAND CLOAKING

(71) Applicant: Outdoor Wireless Networks LLC, Claremont, NC (US)

(72) Inventors: Bin Sun, Suzhou (CN); Jian Zhang, Suzhou (CN); Changfu Chen, Suzhou (CN); Cheng Xue, Suzhou (CN); Pengfei Guo, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 103 days.

(21) Appl. No.: 18/735,673

(22) Filed: Jun. 6, 2024

(65) Prior Publication Data

US 2024/0421494 A1 Dec. 19, 2024

(30) Foreign Application Priority Data

Jun. 14, 2023 (CN) ........................ 202321515249.7

(51) Int. Cl.

*H01Q 15/14* (2006.01)
*H01Q 1/50* (2006.01)
*H01Q 9/26* (2006.01)
*H01Q 1/24* (2006.01)

(52) U.S. Cl.

CPC ................. *H01Q 9/26* (2013.01); *H01Q 1/50* (2013.01); *H01Q 1/246* (2013.01)

(58) Field of Classification Search

CPC ............ H01Q 9/26; H01Q 1/50; H01Q 1/246; H01Q 9/16; H01Q 21/24

See application file for complete search history.

(56) References Cited

U.S. PATENT DOCUMENTS

2004/0140942 A1* 7/2004 Gottl ...................... H01Q 21/24 343/810
2004/0183739 A1* 9/2004 Bisiules ................. H01Q 5/378 343/793
2007/0241983 A1* 10/2007 Cao ........................ H01Q 21/26 343/797
2008/0111757 A1* 5/2008 Bisiules ................... H01Q 5/42 343/803
2009/0278759 A1* 11/2009 Moon ................... H01Q 21/26 343/810

(Continued)

FOREIGN PATENT DOCUMENTS

CN 103094668 A * 5/2013
CN 203026637 U * 6/2013

(Continued)

*Primary Examiner* — Dimary S Lopez Cruz
*Assistant Examiner* — Bamidele A Immanuel
(74) *Attorney, Agent, or Firm* — Myers Bigel, P.A.

(57) ABSTRACT

A box dipole radiating element includes first, second, third and fourth pairs of support stalks, and a box-shaped radiator attached to the first through fourth pairs of support stalks. The box-shaped radiator has first through fourth sides including respective first through fourth radiating arms that are configured to provide generally serpentine-shaped paths for radiation currents in first through fourth vertical planes, which are aligned with the radiating arms and intersect at corners of the box-shaped radiator.

17 Claims, 7 Drawing Sheets

(56) References Cited

U.S. PATENT DOCUMENTS

| | | | | |
|---|---|---|---|---|
| 2010/0309084 | A1* | 12/2010 | Bu | H01Q 9/26 343/824 |
| 2012/0026060 | A1* | 2/2012 | Hanazawa | H01Q 1/32 343/853 |
| 2013/0187822 | A1* | 7/2013 | Shi | H01Q 19/106 343/821 |
| 2013/0271336 | A1* | 10/2013 | Plet | H01Q 1/523 343/796 |
| 2013/0307743 | A1* | 11/2013 | Moon | H01Q 21/08 343/833 |
| 2014/0022131 | A1* | 1/2014 | Azulay | H01Q 1/007 343/727 |
| 2014/0210680 | A1* | 7/2014 | Stoytchev | H01Q 9/26 343/806 |
| 2015/0084823 | A1* | 3/2015 | Wang | H01Q 25/001 343/797 |
| 2017/0222306 | A1* | 8/2017 | Biscontini | H01Q 21/26 |
| 2017/0358870 | A1* | 12/2017 | Hojjat | H01Q 9/44 |
| 2018/0198191 | A1* | 7/2018 | So | H01Q 5/40 |
| 2019/0036226 | A1* | 1/2019 | Ding | H01Q 19/108 |
| 2019/0173186 | A1* | 6/2019 | Farzaneh | H01Q 21/26 |
| 2019/0273315 | A1* | 9/2019 | Hu | H01Q 21/0006 |
| 2020/0127389 | A1* | 4/2020 | Li | H01Q 25/001 |
| 2020/0212598 | A1* | 7/2020 | Gonzalez | H01Q 25/001 |
| 2020/0373668 | A1* | 11/2020 | Wu | H01Q 9/285 |
| 2021/0175639 | A1* | 6/2021 | Wang | H01Q 1/38 |
| 2021/0226344 | A1* | 7/2021 | Wu | H01Q 1/246 |
| 2021/0320399 | A1* | 10/2021 | Bisiules | H01Q 21/24 |
| 2021/0344122 | A1* | 11/2021 | Kaistha | H01Q 19/108 |
| 2021/0359395 | A1* | 11/2021 | Kasani | H01Q 21/0075 |
| 2022/0077600 | A1* | 3/2022 | Sundararajan | H01Q 5/42 |
| 2022/0109238 | A1* | 4/2022 | Varnoosfaderani | H01Q 1/2283 |
| 2022/0181795 | A1* | 6/2022 | Varnoosfaderani | H01Q 25/001 |
| 2022/0285857 | A1* | 9/2022 | Pollayi | H01Q 21/24 |
| 2022/0336964 | A1* | 10/2022 | Wu | H01Q 9/285 |
| 2022/0352649 | A1* | 11/2022 | Wu | H01Q 9/26 |
| 2022/0376394 | A1* | 11/2022 | Huang | H01Q 1/246 |
| 2023/0017375 | A1* | 1/2023 | Wu | H01Q 5/42 |
| 2023/0291123 | A1* | 9/2023 | Kasani | H01Q 1/246 |
| 2023/0361475 | A1* | 11/2023 | Sun | H01Q 5/48 |
| 2023/0395998 | A1* | 12/2023 | Vollmer | H01Q 21/26 |
| 2024/0243460 | A1* | 7/2024 | Schultz | H01Q 1/288 |

FOREIGN PATENT DOCUMENTS

| | | | | | |
|---|---|---|---|---|---|
| CN | 103972663 | A | * | 8/2014 | |
| CN | 105990649 | A | * | 10/2016 | |
| CN | 106169644 | A | * | 11/2016 | H01Q 21/00 |
| CN | 206516750 | U | * | 9/2017 | |
| CN | 107394394 | A | * | 11/2017 | H01Q 19/10 |
| CN | 108461904 | A | * | 8/2018 | H01Q 21/30 |
| CN | 109075436 | B | * | 6/2021 | H01Q 21/24 |
| CN | 107046167 | B | * | 12/2023 | H01Q 1/36 |
| WO | 2020197849 | A1 | | 10/2020 | |
| WO | 2020205228 | A1 | | 10/2020 | |
| WO | 2022072148 | A1 | | 4/2022 | |

* cited by examiner

BASE STATION ANTENNAS HAVING COMPACT DUAL-POLARIZED BOX DIPOLE RADIATING ELEMENTS THEREIN THAT SUPPORT HIGH BAND CLOAKING

FIELD OF THE INVENTION

The present invention relates to radio communications and antennas and, more particularly, to dual-polarized antennas for cellular communications and methods of operating same.

BACKGROUND

Cellular communications systems are well known in the art. In a typical cellular communications system, a geographic area is often divided into a series of regions that are commonly referred to as "cells", which are served by respective base stations. Each base station may include one or more base station antennas (BSAs) that are configured to provide two-way radio frequency ("RF") communications with mobile subscribers that are within the cell served by the base station. In many cases, each base station is divided into "sectors." In perhaps the most common configuration, a hexagonally shaped cell is divided into three 120° sectors, and each sector is served by one or more base station antennas, which generate radiating patterns (a/k/a "antenna beams") that have an azimuth Half Power Beam Width (HPBW) of approximately 65° to thereby provide sufficient coverage to each 120° sector. Typically, the base station antennas are mounted on a tower or other raised structure and the antenna beams are directed outwardly therefrom. Base station antennas typically include one or more linear or planar phased arrays of radiating elements.

In order to accommodate an increasing volume of cellular communications, cellular operators have added cellular service in a variety of frequency bands. While in some cases it is possible to use a single linear array of so-called "wideband" radiating elements to provide service in multiple frequency bands, in other cases it may be necessary to use different linear arrays of radiating elements in multi-band base station antennas to support service in the additional frequency bands.

One conventional multi-band base station antenna design includes at least one linear array of relatively "low-band" radiating elements, which can be used to provide service in some or all of a 617-960 MHz frequency band. In addition, to reduce costs and provide for more compact antennas, some or all of these "low-band" radiating elements may be configured to surround a corresponding relatively "high-band" radiating element that is used to provide service in some or all of a 1695-2690 MHz frequency band.

A conventional box dipole radiating element may include four dipole radiators that are arranged to define a box-like shape. The four dipole radiators may extend in a common plane, and may be mounted forwardly of a reflector that may (but need not) extend parallel to the common plane. So called feed stalks may be used to mount the four dipole radiators forwardly from the reflector, and may be used to pass RF signals between the dipole radiators and other components of the antenna. In some of these conventional box dipole radiating elements, a total of eight feed stalks (4×2) may be provided and may connect to the box dipole radiators at the corners of the box.

For example, as illustrated by FIGS. 1A-1B, a conventional multi-band radiator 10 for a base station antenna may include a relatively high band radiating element **10*a* centered within and surrounded on four sides by a relatively low band radiating element 10*b*, which is configured as a box dipole radiating element ("box dipole") including four dipole radiators that are arranged to define a box shape when viewed from the front. RF signals may be fed to the four dipole radiators of a conventional box dipole radiating element 10*b* through the feed stalks at two opposed and "excited" corners of the "box," as is shown in FIG. 1A. In response, common mode (CM) currents are forced automatically onto the feed stalks at the two diametrically opposed non-excited corners of the box dipole, in response to differential mode (DM) currents that are fed to the two excited "differential mode" ports. And, because these common mode currents radiate as a monopole on these "non-excited" feed stalks, the overall radiation pattern of the box dipole 10*b* is actually a combination of two dipoles and two monopoles (with "nulls"), as illustrated by the simplified radiation patterns of FIG. 1B. Unfortunately, the radiation stemming from monopole operation can be highly undesirable when designing a box dipole radiator. For example, although having common mode currents radiating at the same time with differential mode currents in the box dipole 10*b* can be expected to slightly narrow the azimuth HPBW of the box dipole 10*b* because of the presence of two nulls caused by the monopole radiators, a concurrent co-polarization radiation pattern of the box dipole 10*b*** can be expected to demonstrate rising "shoulders" in the radiation pattern, which refer to radiation emitted outside the main lobe in the azimuth plane. These shoulders can significantly degrade overall antenna performance.

Attempts have been made to reduce these potentially adverse characteristics of conventional box dipole radiating elements. For example, as disclosed in commonly assigned PCT Patent Publication No. WO 2020/197849 A1, built-in stalk filters may be utilized to block unwanted common mode (i.e., monopole) radiation parasitics. And, in commonly assigned PCT Patent Publication No. WO 2020/205228 A1, slanted feed paths may be utilized to suppress common mode radiation. Finally, in commonly assigned PCT Patent Publication No. WO 2022/072148 A1, a box dipole radiating element is disclosed, which uses a compact quad arrangement of substantially coplanar radiating arms to generate radiation patterns having reduced "shoulders" located outside the main lobe in the azimuth plane.

SUMMARY OF THE INVENTION

A compact, box dipole, radiating element of a base station antenna may support relatively low-band slant-polarized radiation, with relatively high band cloaking using periodic radiating arms. According to some embodiments of the invention, a box dipole radiating element is provided with at least one support stalk, and a box-shaped radiator attached to the at least one support stalk. The box-shaped radiator has first through fourth sides including respective first through fourth radiating arms that are configured to provide periodic and generally serpentine-shaped paths for radio-frequency (RF) radiation currents. Advantageously, these radiation currents are provided in first through fourth vertical planes, which are aligned with the radiating arms and intersect at corners of the box-shaped radiator.

In additional embodiments of the invention, the generally serpentine-shaped paths in the radiating arms have a repeating periodic shape, such as a generally square sinusoidal shape. In addition, the generally serpentine-shaped paths may include a plurality of forward-projecting generally T-shaped stubs, and a plurality of rearward-projecting generally T-shaped stubs. To reduce costs, the first through fourth radiating arms may be made from stamped sheet metal; however, in alternative embodiments, the first through fourth radiating arms may be formed using dual-sided printed circuit boards (PCBs) having patterned metal traces on both sides thereof.

According to further embodiments of the invention, the at least one support stalk is configured as first, second, third and fourth pairs of support stalks; the first radiating arm has a first end galvanically or capacitively coupled to a first one of the support stalks in the first pair, and a second end galvanically or capacitively coupled to a second one of the support stalks in the second pair; the second radiating arm has a first end galvanically or capacitively coupled to a first one of the support stalks in the second pair, and a second end galvanically or capacitively coupled to a second one of the support stalks in the third pair; the third radiating arm has a first end galvanically or capacitively coupled to a first one of the support stalks in the third pair, and a second end galvanically or capacitively coupled to a second one of the support stalks in the fourth pair; and the fourth radiating arm has a first end galvanically or capacitively coupled to a first one of the support stalks in the fourth pair, and a second end galvanically or capacitively coupled to a second one of the support stalks in the first pair. A support stalk base may also be provided, which is attached to proximal ends of the first, second, third and fourth pairs of support stalks. In some instances, the support stalk base and the first, second, third and fourth pairs of support stalks are formed as a unitary piece of stamped and bent sheet metal.

According to another embodiment of the invention, a first coaxial feed cable is provided and mounted to the first pair of support stalks, such that a center conductor within the first coaxial feed cable is electrically connected to the first one of the support stalks within the first pair and a shield conductor within the first coaxial feed cable is electrically connected to the second one of the support stalks within the first pair; a second coaxial feed cable is provided and mounted to the second pair of support stalks, such that a center conductor within the second coaxial feed cable is electrically connected to the first one of the support stalks within the second pair and a shield conductor within the second coaxial feed cable is electrically connected to the second one of the support stalks within the second pair; a third coaxial feed cable is provided and mounted to the third pair of support stalks, such that a center conductor within the third coaxial feed cable is electrically connected to the first one of the support stalks within the third pair and a shield conductor within the third coaxial feed cable is electrically connected to the second one of the support stalks within the third pair; and a fourth coaxial feed cable is provided and mounted to the fourth pair of support stalks, such that a center conductor within the fourth coaxial feed cable is electrically connected to the first one of the support stalks within the fourth pair and a shield conductor within the fourth coaxial feed cable is electrically connected to the second one of the support stalks within the fourth pair. Moreover, in some of these embodiments, the first, second, third, and fourth coaxial feed cables are mounted to the second ones of the support stalks within the first, second, third and fourth pairs, adjacent generally L-shaped bends therein. For example, the shield conductor in the first coaxial feed cable may be soldered to an opening in the second one of the support stalks within the first pair, whereas the center conductor within the first coaxial feed cable may extend through the opening in the second one of the support stalks within the first pair. The same also applies to the second, third and fourth coaxial feed cables and their corresponding pairs of support stalks.

According to still further embodiments of the invention, a multi-band antenna is provided, which includes a reflector and a first radiating element on a forward facing surface of the reflector. The first radiating element may include a support stalk base on the forward-facing surface of the reflector, and first, second, third and fourth pairs of support stalks mounted to and extending forwardly from the support stalk base. First, second, third and fourth coaxial feed signal cables are provided, which are mounted to the first, second, third and fourth pairs of support stalks, respectively, adjacent generally L-shaped bends therein. A box-shaped radiator is provided, which is attached to the first through fourth pairs of support stalks. The box-shaped radiator has first through fourth sides including respective first through fourth radiating arms. These first through fourth radiating arms are configured to provide nonlinear paths for radiation currents in first through fourth vertical planes, which are aligned with the radiating arms and intersect at corners of the box-shaped radiator. Moreover, to increase the integration of radiating elements on the reflector, a smaller second radiating element may be provided, which extends through an opening in the support stalk base and is nested between the first through fourth pairs of support stalks. In some embodiments, this second radiating element may be configured to operate in a second frequency band that is higher than a first frequency band associated with the radiation currents.

DETAILED DESCRIPTION OF EMBODIMENTS

Figure 1A:
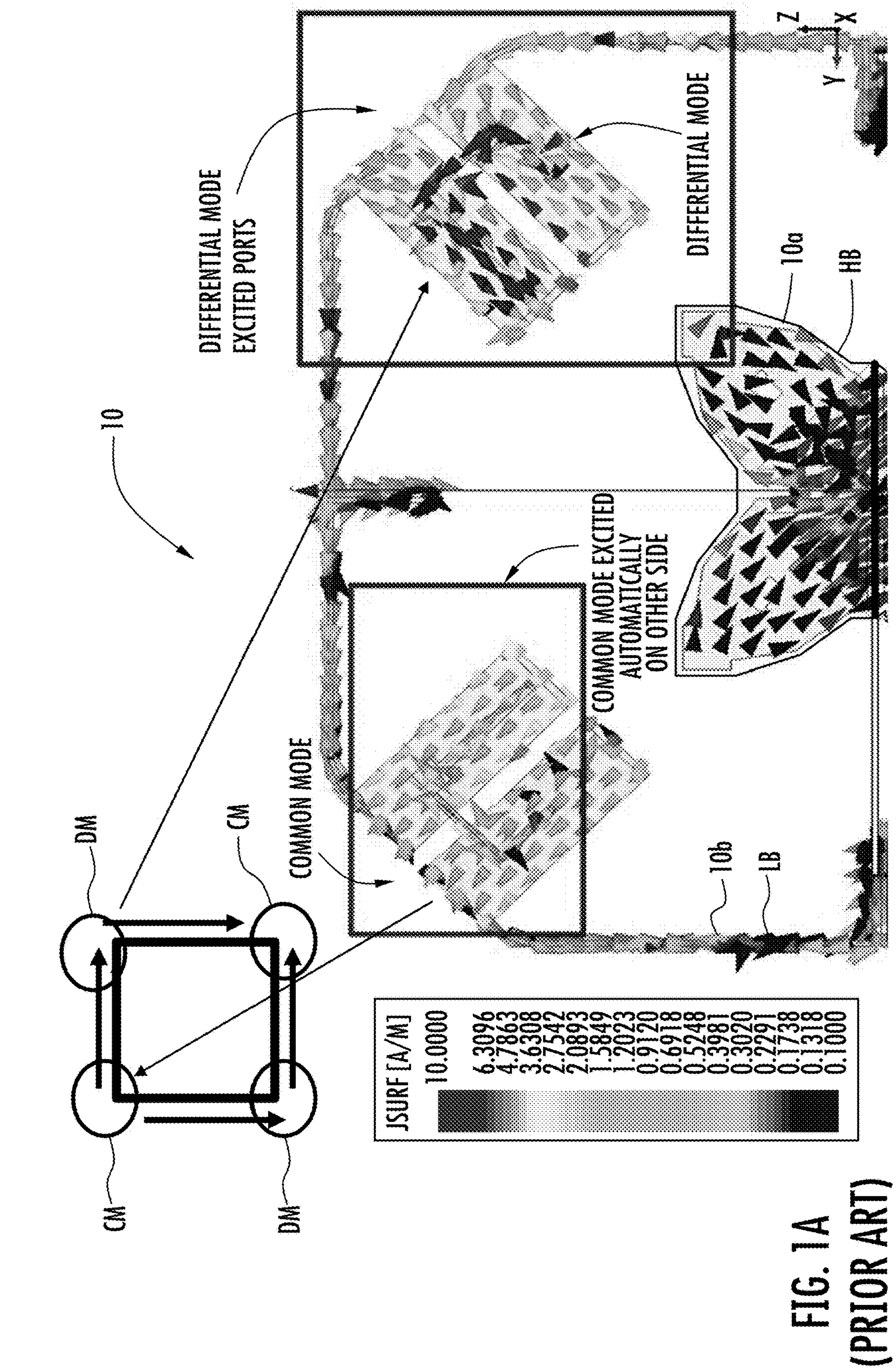
FIG. 1A (PRIOR ART)
FIG. 1A is a schematic diagram of a conventional box dipole radiating element that includes a partial perspective view of the box dipole radiating element showing simulated differential mode and common mode currents therein, according to the prior art and a schematic front view of the box dipole radiating element.
Figure 1B:
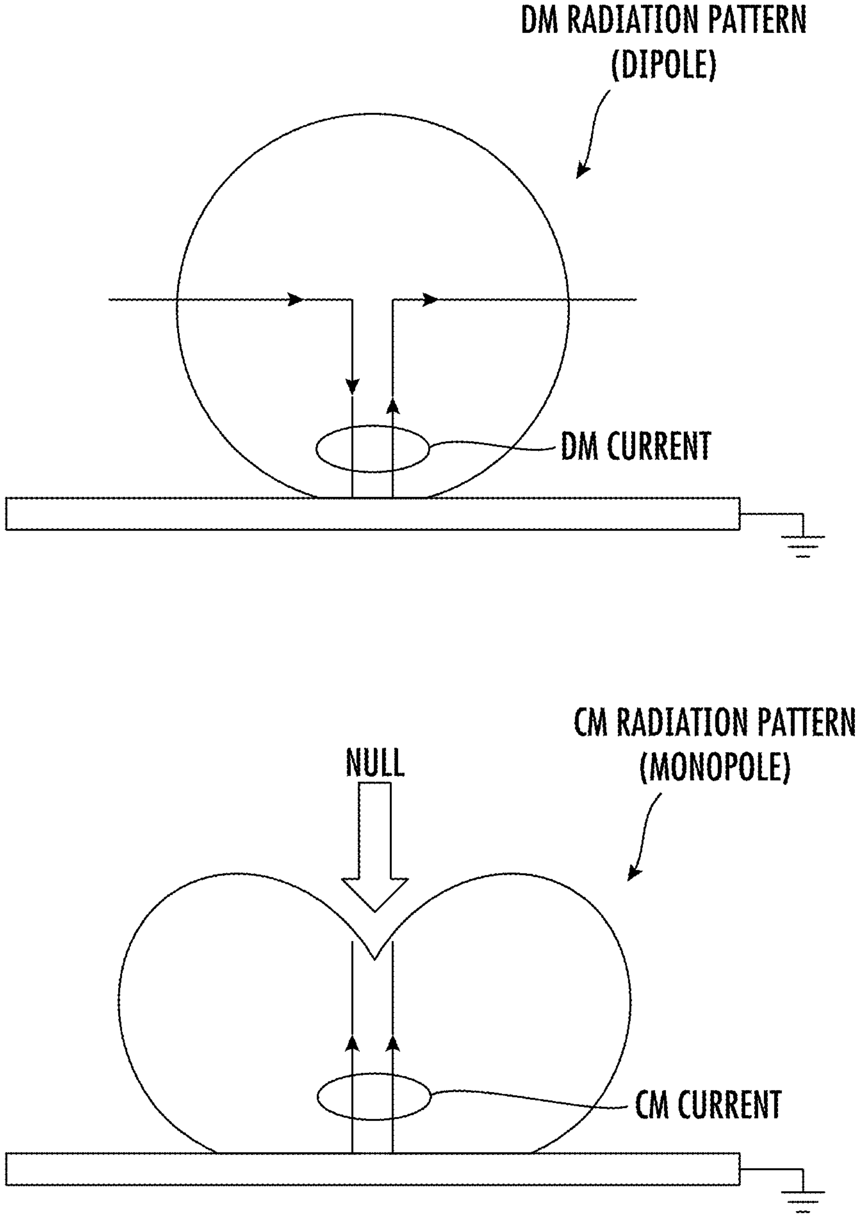
FIG. 1B (PRIOR ART)
FIG. 1B illustrates radiation patterns of a dipole antenna having a differential mode (DM) and a monopole antenna having a common mode (CM), which when combined together provide a radiation pattern of a conventional box dipole antenna.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

Referring now to FIGS. 2A-2D, a cloaked box dipole radiating element 100 that supports relatively low-band slant-polarized radiation includes first, second, third and fourth pairs of support stalks 30*a*-30*d* and a box-shaped radiator 20, which is attached, at four corners, to forward-extending distal ends of the four pairs of support stalks 30*a*-30*d*, as shown. In addition, first through fourth sides of the box-shaped radiator 20 are defined by respective first through fourth radiating arms 20*a*-20*d*, which are configured to provide periodic and generally serpentine-shaped paths for radio-frequency (RF) radiation currents in first through fourth vertical planes; these vertical planes are aligned with the radiating arms 20*a*-20*d* and intersect at corners of the box-shaped radiator 20. Advantageously, the generally serpentine-shaped paths facilitate a radiating element 100 having compact size and excellent relatively high band cloaking characteristics, while maintaining sufficient electrical length of the radiating arms 20*a*-20*d*.

Figure 2A:
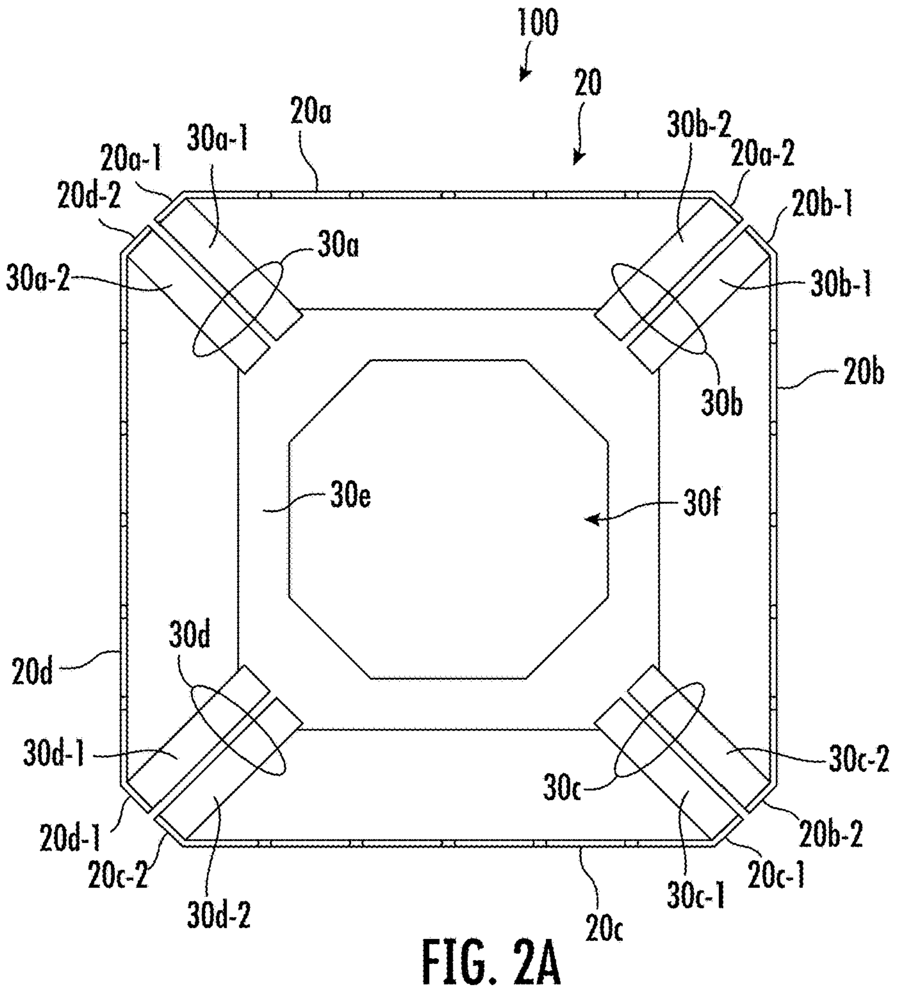
FIG. 2A is a top-down plan view of a box dipole radiating element according to an embodiment of the invention.
Figure 2B:
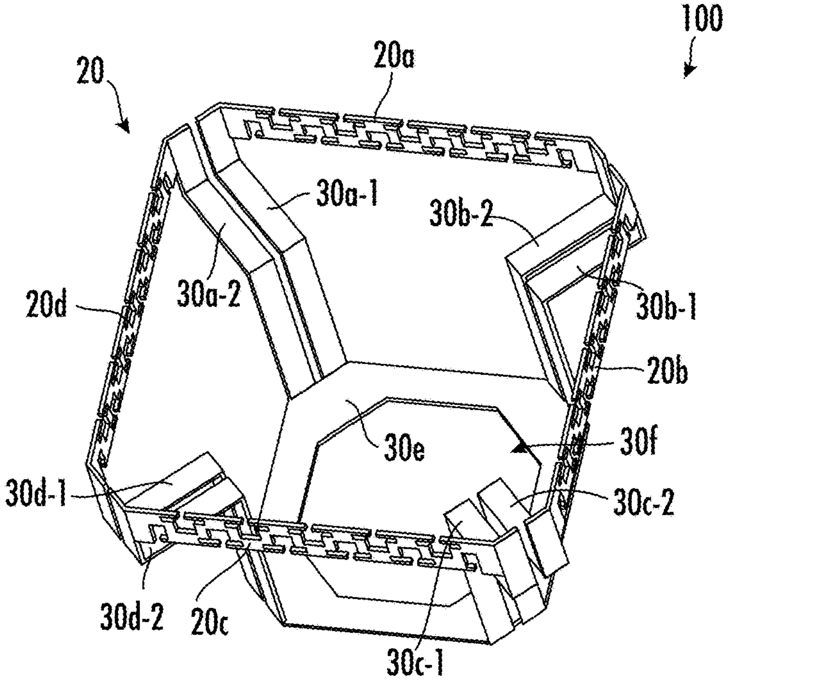
FIG. 2B is a perspective view of an embodiment of the box dipole radiating element of FIG. 2A.
Figure 2C:
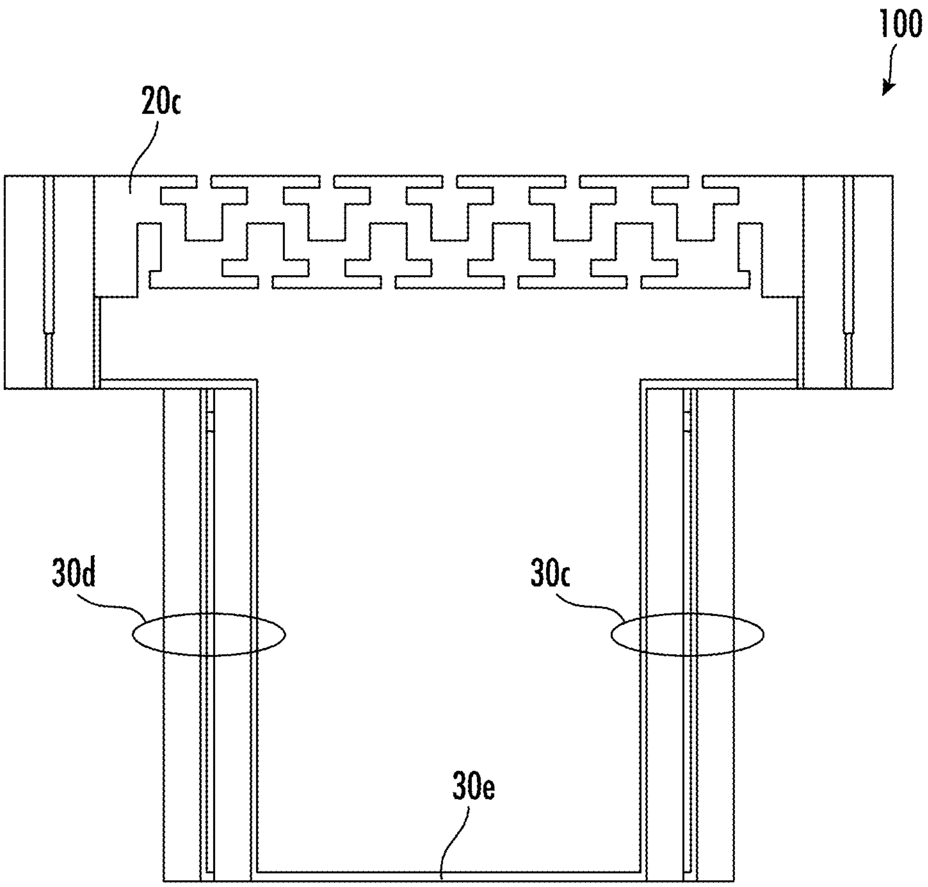
FIG. 2C is a side view of an embodiment of the box dipole radiating element of FIG. 2A.

As shown best by FIGS. 2A-2B, the first radiating arm 20*a* has a first end 20*a*-1 electrically coupled to a first one of the support stalks in the first pair 30*a*-1, and a second end 20*a*-2 electrically coupled to a second one of the support stalks in the second pair 30*b*-2. Similarly, the second radiating arm 20*b* has a first end 20*b*-1 electrically coupled to a first one of the support stalks in the second pair 30*b*-1, and a second end 20*b*-2 electrically coupled to a second one of the support stalks in the third pair 30*c*-2. And, the third radiating arm 20*c* has a first end 20*c*-1 electrically coupled to a first one of the support stalks in the third pair 30*c*-1, and a second end 20*c*-2 electrically coupled to a second one of the support stalks in the fourth pair 30*d*-2. Finally, the fourth radiating arm 20*d* has a first end 20*d*-1 electrically coupled to a first one of the support stalks in the fourth pair 30*d*-1, and a second end 20*d*-2 electrically coupled to a second one of the support stalks in the first pair 30*a*-2. In some embodiments of the invention, the electrical coupling between the support stalks 30*a*-30*d* and the radiating arms 20*a*-20*d* may take the form of galvanic connections, or capacitive coupling using thin dielectric layers (not shown) extending between the ends of the arms and corresponding support stalks. Moreover, because of the generally box-shaped configuration of the radiating element 100, an inner surface of the first radiating arm 20*a* faces an inner surface of the third radiating arm 20*c*, and an inner surface of the second radiating arm 20*b* faces an inner surface of the fourth radiating arm 20*d*, as shown best by FIG. 2A.

According to some embodiments of the invention, a generally square-shaped and electrically conductive support stalk base 30*e*, having an opening 30*f* therein, may be provided for improved structural integrity and mounting support (e.g., on an underlying reflector), and to provide electrical paths for RF currents (e.g., common-mode (CM), differential-mode (DM)). As shown, this support stalk base 30*e* is attached, at corners, to proximal ends of the first, second, third and fourth pairs of support stalks 30*a*-30*d*. Although not wishing to be bound by any particular configuration or means of assembly, the support stalk base 30*e* and the first, second, third and fourth pairs of support stalks 30*a*-30*d* may be formed as a unitary piece of stamped and bent sheet metal in some embodiments; however, in other configurations, a unitary piece of dielectric material (e.g., plastic, dielectric board) having metal surfaces thereon (e.g., patterned traces, electroplated surfaces) may be used.

Figure 2D:
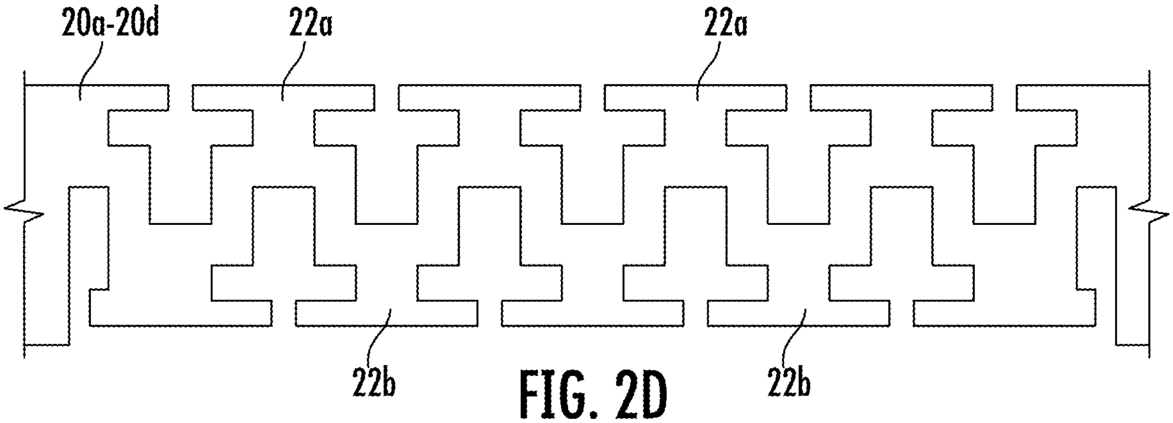
FIG. 2D is a side view of a sheet metal radiating arm that supports a serpentine-shaped path for radiation currents therein, according to the embodiment of FIG. 2C.
Figure 4A:
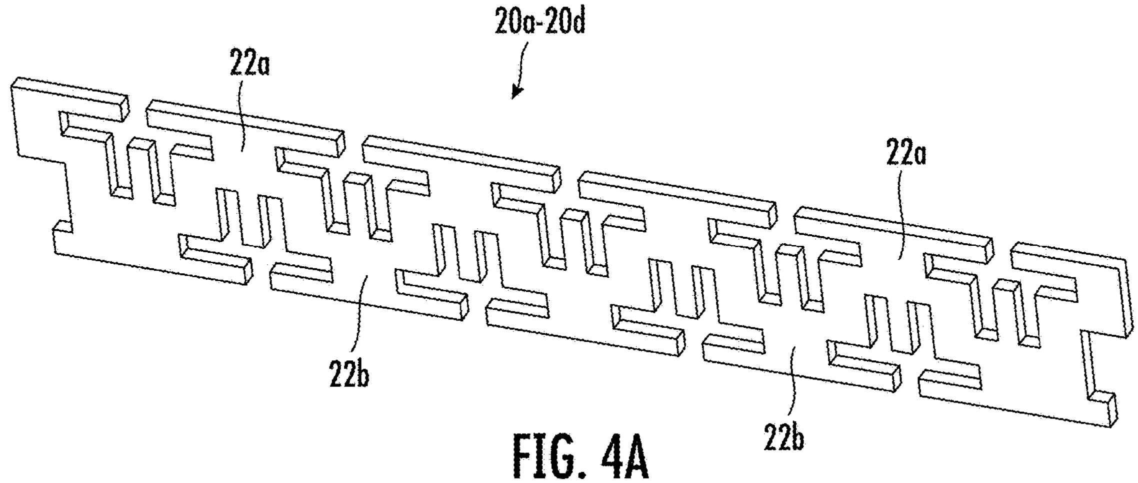
FIG. 4A is a perspective view of a sheet metal radiating arm that supports a serpentine-shaped path for radiation currents therein, which may be utilized within the box dipole radiating element of FIG. 2A.
Figure 4B:
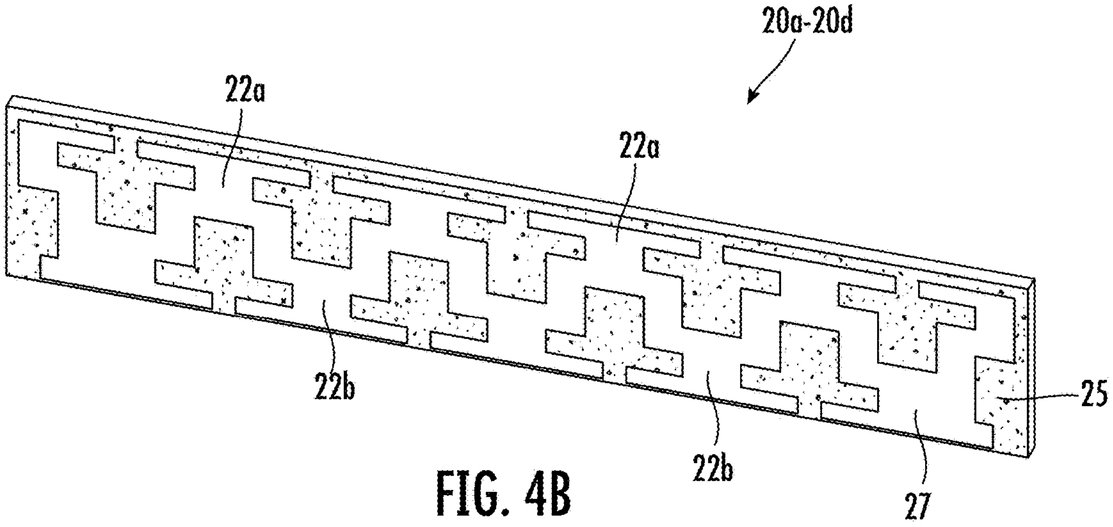
FIG. 4B is a perspective view of a printed circuit board (PCB) radiating arm that supports a serpentine-shaped path for radiation currents therein, which may be utilized within the box dipole radiating element of FIG. 2A.

Referring again to FIGS. 2C-2D and to FIG. 4A, the first through fourth radiating arms 20*a*-20*d* are configured to have a generally square sinusoidal shape (for RF current flow) and include a plurality of forward-projecting generally T-shaped stubs 22*a* and a plurality of rearward-projecting generally T-shaped stubs 22*b*, which can advantageously curb relatively high band radiation by influencing current flow direction within the sinusoidal shape. And, according to some embodiments of the invention, these first through fourth radiating arms 20*a*-20*d* may be made from stamped sheet metal. However, as shown by FIG. 4B, each of the radiating arms 20*a*-20*b* may alternatively be formed as a dual-sided printed circuit board (PCB) 25 having patterned metal traces 27 thereon, which define the generally square sinusoidal shape shown by FIG. 4A, or as shown by FIG. 2D, etc.

According to further embodiments of the invention, the four pairs of support stalks 30*a*-30*d* may be configured to provide RF signal paths for a pair of cross-polarized dipole feed signals (e.g., Feed 1 (0°, 180°) at +45°, and Feed 2 (0°, 180°) at −45°), which can be supplied by four coaxial feed cables, for example. As will be understood by those skilled in the art, the feed signals Feed 1 and Feed 2 may be generated by passing an RF input signal through a power divider (not shown) that splits the RF input signal into substantially equal magnitude, equal phase RF signals that constitute Feed 1 and Feed 2.

Figure 3A:
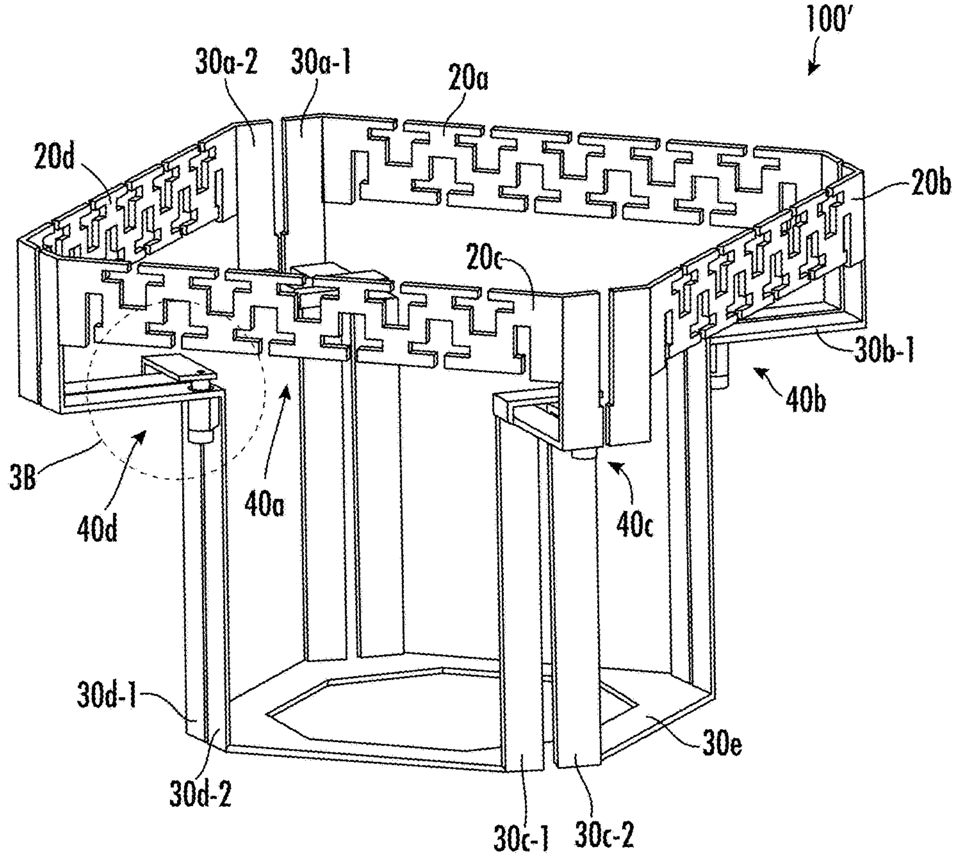
FIG. 3A is a perspective view of a box dipole radiating element, according to an embodiment of the invention.
Figure 3B:
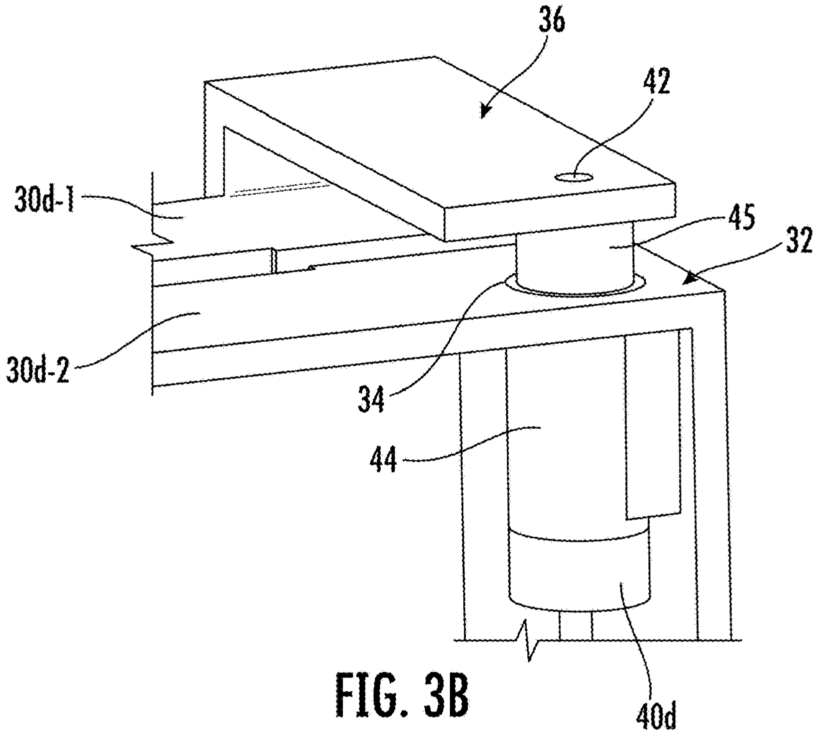
FIG. 3B is an enlarged perspective view of a highlighted region "3B" in the box dipole radiating element of FIG. 3A, which illustrates how a coaxial feed cable can be mounted and electrically coupled to a corresponding pair of support stalks, according to an embodiment of the invention.

In particular, as shown by the radiating element 100' of FIGS. 3A-3B, a first coaxial feed cable 40*a* may be mounted to the first pair of support stalks 30*a*, such that: (i) a center conductor 42 within the first coaxial feed cable 40*a* is electrically connected to the first one of the support stalks within the first pair 30*a*-1, and (ii) a surrounding shield conductor 44 within the first coaxial feed cable 40*a* is electrically connected to the second one of the support stalks within the first pair 30*a*-2. Likewise, a second coaxial feed cable 40*b* may be mounted to the second pair of support stalks 30*b*, such that: (i) a center conductor 42 within the second coaxial feed cable 40*b* is electrically connected to the first one of the support stalks within the second pair 30*b*-1, and (ii) a surrounding shield conductor 44 within the second coaxial feed cable 40*b* is electrically connected to the second one of the support stalks within the second pair 30*b*-2. Similarly, a third coaxial feed cable 40*c* may be mounted to the third pair of support stalks 30*c*, such that: (i) a center conductor 42 within the third coaxial feed cable 30*c* is electrically connected to the first one of the support stalks within the third pair 30*c*-1, and (ii) a surrounding shield conductor 44 within the third coaxial feed cable 40*c* is electrically connected to the second one of the support stalks within the third pair 30*c*-2. Finally, a fourth coaxial feed cable 40*d* may be mounted to the fourth pair of support stalks 30*d*, such that: (i) a center conductor 42 within the fourth coaxial feed cable 40*d* is electrically connected to the first one of the support stalks within the fourth pair 30*d*-1, and (ii) a surrounding shield conductor 44 within the fourth coaxial feed cable 40*d* is electrically connected to the second one of the support stalks within the fourth pair 30*d*-2.

Moreover, as illustrated by FIG. 3B, which is an enlarged perspective view of a highlighted region "3B" in the box dipole radiating element of FIG. 3A, the fourth coaxial feed cable 40*d* can be mounted to the second one of the support stalks within the fourth pair 30*d*-2, adjacent a generally L-shaped bend 32 therein. For example, this mounting can be performed by soldering the shield conductor 44 within the fourth coaxial feed cable 40*d* into an opening 34 in the second one of the support stalks within the fourth pair 30*d*-2, and extending a center conductor 42 (and cable insulation 45) within the fourth coaxial feed cable 40*d* through the opening 34 in the second one of the support stalks within the fourth pair 30*d*-2, such that a direct electrical connection can be formed (e.g., by solder) between the center conductor 42 and an L-shaped electrically conductive tab 36 (e.g., bent sheet metal) extending from the first one of the support stalks within the fourth pair 30*d*-1. Similar mounting operations may also be utilized to mount the first, second and third coaxial cables 40*a*-40*c* to the first, second and third pairs of support stalks 30*a*-30*c*, respectively.

Figure 5A:
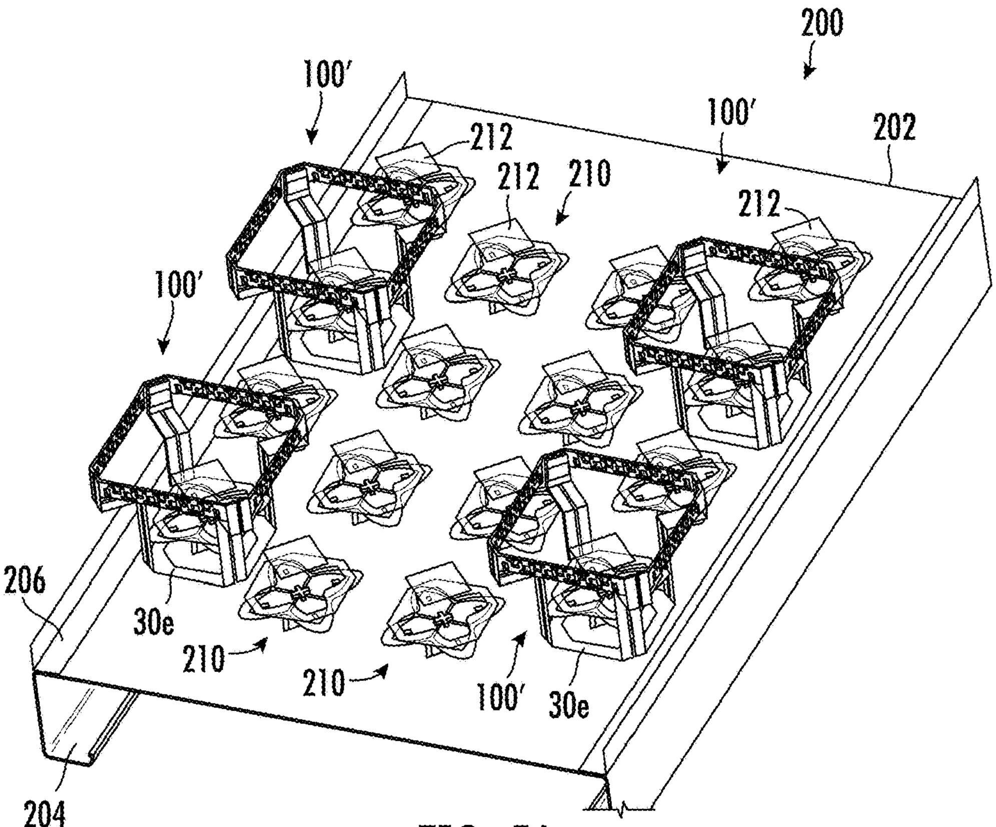
FIG. 5A is a perspective view of a multi-band antenna having an array of the box dipole radiating elements of FIG. 2A therein, according to an embodiment of the invention.
Figure 5B:
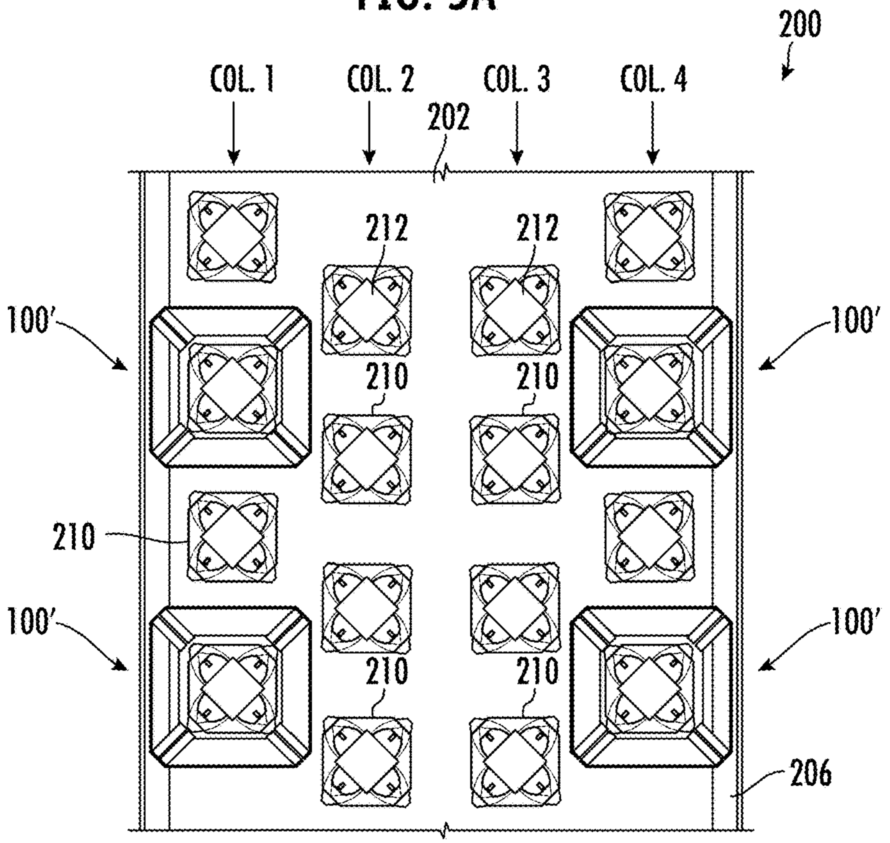
FIG. 5B is a plan view of the multi-band antenna of FIG. 5A.

Referring now to FIGS. 5A-5B, a multi-band antenna 200 according to an embodiment of the invention is illustrated as including: (i) a reflector 202 with rear-facing RF chokes 204 and pair of L-shaped fences 206, (ii) a quad arrangement of the relatively low band (LB) radiating element 100' of FIGS. 3A-3B, which is aligned with first and fourth columns (Col. 1, Col. 4) of the antenna 200, and (iii) sixteen relatively high band (HB) radiating elements 210 (with directors 212), which are arranged into four columns (Cols. 1-4) having four rows per column. As shown, eight HB radiating elements 210 in the second and third columns (Col. 2, Col. 3) may be offset relative to eight HB radiating elements 210 in the first and fourth columns. In addition, two HB radiating elements 210 in the first column and two HB radiating elements 210 in the fourth column may be "nested" within corresponding openings in the support stalk bases 30*e* of four corresponding LB radiating elements 100', as shown.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A box dipole radiating element, comprising:

first through fourth pairs of support stalks;

a box-shaped radiator attached to at least one pair of support stalks among the first through fourth pairs of support stalks, the box-shaped radiator having first through fourth sides comprising respective first through fourth radiating arms, wherein the first through fourth radiating arms extend in respective first through fourth planes, where the first plane is parallel to the third plane, the second plane is parallel to the fourth plane, and the first plane is perpendicular to the second plane;

a first coaxial feed cable mounted to the first pair of support stalks, such that a first center conductor within the first coaxial feed cable is electrically connected to a first one of the support stalks in the first pair and a first shield conductor within the first coaxial feed cable is electrically connected to a second one of the support stalks in the first pair; and a second coaxial feed cable mounted to the second pair of support stalks, such that a second center conductor within the second coaxial feed cable is electrically connected to a first one of the support stalks in the second pair and a second shield conductor within the second coaxial feed cable is electrically connected to a second one of the support stalks in the second pair, wherein the first shield conductor is electrically connected to the second center conductor through at least one of the first through fourth radiating arms, wherein the first shield conductor extends around the first center conductor, and wherein the second shield conductor extends around the second center conductor.

2. The radiating element of claim 1, wherein the first radiating arm has a first end electrically coupled to the first one of the support stalks in the first pair, and a second end electrically coupled to the second one of the support stalks in the second pair, wherein the second radiating arm has a first end electrically coupled to the first one of the support stalks in the second pair, and a second end electrically coupled to a second one of the support stalks in the third pair, wherein the third radiating arm has a first end electrically coupled to a first one of the support stalks in the third pair, and a second end electrically coupled to a second one of the support stalks in the fourth pair, wherein the fourth radiating arm has a first end electrically coupled to a first one of the support stalks in the fourth pair, and a second end electrically coupled to the second one of the support stalks in the first pair, and wherein the first through fourth pairs of support stalks are integrally connected to an electrically conductive support stalk base.

3. The radiating element of claim 2, wherein the first end of the first radiating arm is galvanically connected to the first one of the support stalks in the first pair.

4. The radiating element of claim 2, wherein the first end of the first radiating arm is capacitively coupled to the first one of the support stalks in the first pair.

5. The radiating element of claim 1, wherein an inner surface of the first radiating arm faces an inner surface of the third radiating arm, and an inner surface of the second radiating arm faces an inner surface of the fourth radiating arm.

6. The radiating element of claim 1, further comprising:

a third coaxial feed cable mounted to the third pair of support stalks, such that a third center conductor within the third coaxial feed cable is electrically connected to a first one of the support stalks within the third pair and a third shield conductor within the third coaxial feed cable is electrically connected to a second one of the support stalks within the third pair; and a fourth coaxial feed cable mounted to the fourth pair of support stalks, such that a fourth center conductor within the fourth coaxial feed cable is electrically connected to a first one of the support stalks within the fourth pair and a fourth shield conductor within the fourth coaxial feed cable is electrically connected to a second one of the support stalks within the fourth pair.

7. The radiating element of claim 6, wherein the first coaxial feed cable is mounted to the second one of the support stalks within the first pair, adjacent a generally L-shaped bend therein, wherein the generally L-shaped bend comprises a bend that is around 90°.

8. A box dipole radiating element, comprising:

first through fourth pairs of support stalks;

first through fourth coaxial feed cables mounted on the first through fourth pairs of support stalks; and a box-shaped radiator attached to the first through fourth pairs of support stalks, wherein each pair of support stalks comprises a first support stalk and a second support stalk, the first support stalk comprising two generally L-shaped bends, and the second support stalk comprising two generally L-shaped bends, wherein the first coaxial feed cable comprises a first center conductor that is electrically connected to the first support stalk of the first pair of support stalks, and a first shield conductor that is electrically connected to the second support stalk of the first pair of support stalks, wherein the second coaxial feed cable comprises a second center conductor that is electrically connected to the first support stalk of the second pair of support stalks, and a second shield conductor that is electrically connected to the second support stalk of the second pair of support stalks, wherein the first shield conductor is electrically connected to the second center conductor through the box-shaped radiator, wherein the first shield conductor extends around the first center conductor, and wherein the second shield conductor extends around the second center conductor.

9. The radiating element of claim 8, wherein the box-shaped radiator has first through fourth sides comprising respective first through fourth radiating arms that are configured to provide generally serpentine-shaped paths for radiation currents.

10. The radiating element of claim 9, wherein the first through fourth radiating arms extend in respective first through fourth planes, where the first plane is parallel to the third plane, the second plane is parallel to the fourth plane, and the first plane is perpendicular to the second plane.

11. The radiating element of claim 10, wherein the first and second support stalks in the first pair of support stalks each comprises a first portions extending in a fifth plane, a second portion extending in a sixth plane that is parallel to the fifth plane, and a third portion that extends in a seventh plane that is perpendicular to the fifth and sixth planes.

12. The radiating element of claim 11, wherein the fifth and sixth planes intersects the first plane at a 45° angle.

13. The radiating element of claim 12, wherein the fifth and sixth planes intersects the second plane at a −45° angle.

14. A box dipole radiating element, comprising:

at least one pair of support stalks, each of the at least one pair of support stalks comprising a first support stalk and a second support stalk;

at least one of coaxial feed cables mounted on the at least one pair of support stalks, each of the at least one of coaxial feed cables comprising a center conductor and a shield conductor that extends around the center conductor; and a box-shaped radiator attached to the at least one pair of support stalks, the box-shaped radiator having first through fourth sides comprising respective first through fourth radiating arms that are configured to provide generally serpentine-shaped paths for radiation currents in first through fourth planes, wherein the generally serpentine-shaped paths in the radiating arms have a repeating periodic shape, wherein the generally serpentine-shaped paths comprise a plurality of forward-projecting generally T-shaped stubs and a plurality of rearward-projecting generally T-shaped stubs, wherein the center conductor of a first one of the at least one of coaxial feed cables is electrically connected to the first support stalk of a first one of the at least one pair of support stalks, wherein the shield conductor of a second one of the at least one of coaxial feed cables is electrically connected to the second support stalk of a second one of the at least one pair of support stalks, and wherein the center conductor of the first one of the at least one of coaxial feed cables is electrically connected to the shield conductor of the second one of the at least one of coaxial feed cables through at least one of the first through fourth radiating arms.

15. The radiating element of claim 14, wherein the plurality of forward-projecting generally T-shaped stubs comprises at least three generally T-shaped stubs, and the plurality of rearward-projecting generally T-shaped stubs comprises at least three generally T-shaped stubs.

16. The radiating element of claim 14, wherein an inner surface of the first radiating arm faces an inner surface of the third radiating arm, and an inner surface of the second radiating arm faces an inner surface of the fourth radiating arm.

17. The radiating element of claim 14, wherein each of the at least one pair of support stalks comprises a first end connected to the box-shaped radiator, and a second end connected to a support stalk base that is electrically conductive.

* * * * *